Figure 6:
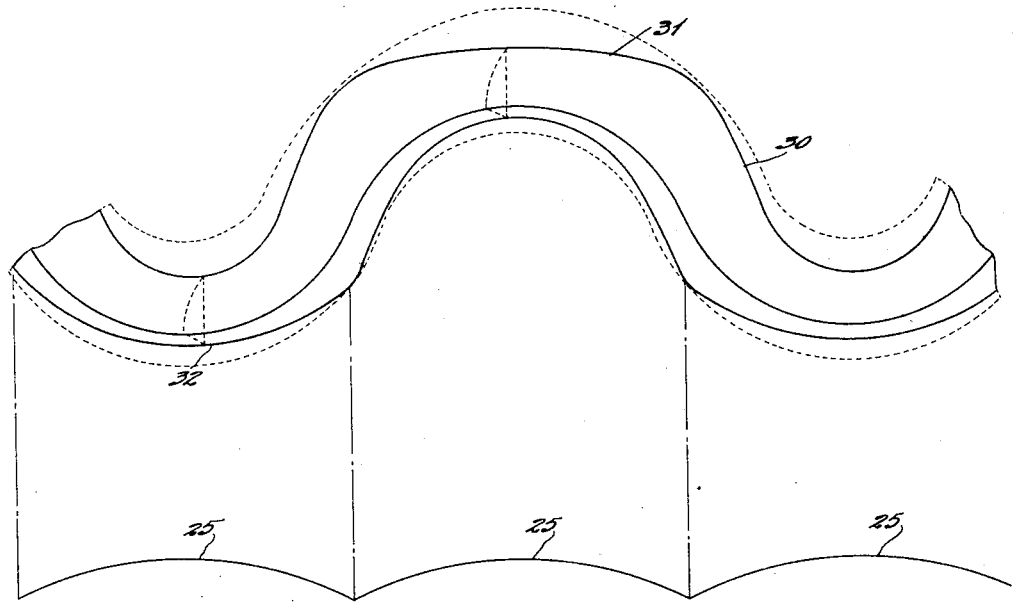

Aug. 13, 1929.  T. W. ROLPH ET AL  1,724,727
LUMINAIR
Original Filed Dec. 24, 1925   3 Sheets-Sheet 1
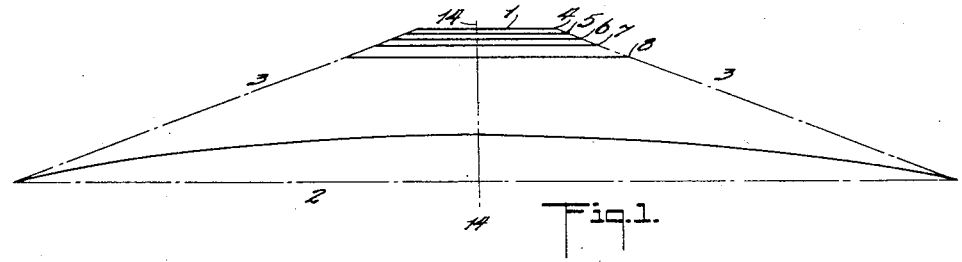
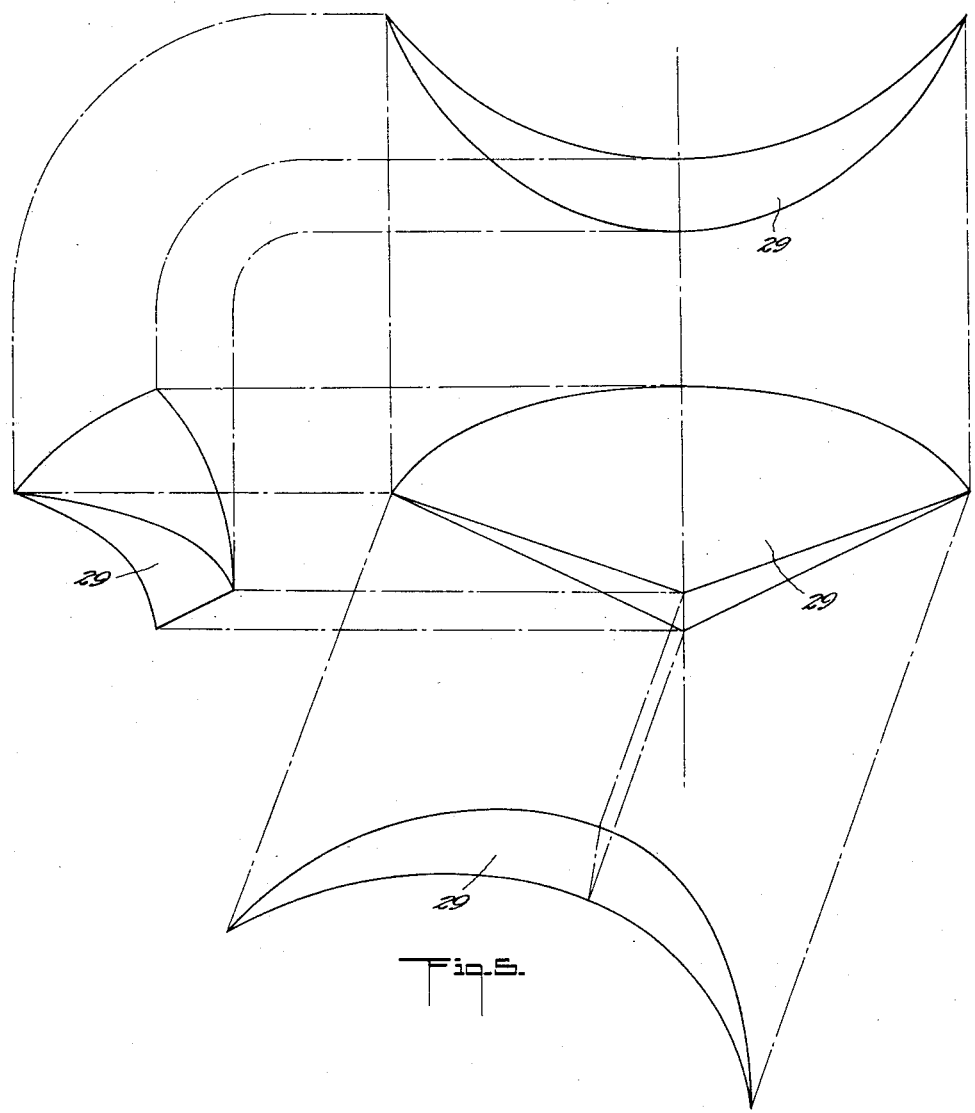
INVENTORS
THOMAS W. ROLPH
WILLIAM A. DOREY
BY
ATTORNEY Aug. 13, 1929. T. W. ROLPH ET AL 1,724,727
LUMINAIR
Original Filed Dec. 24, 1925   3 Sheets-Sheet 2
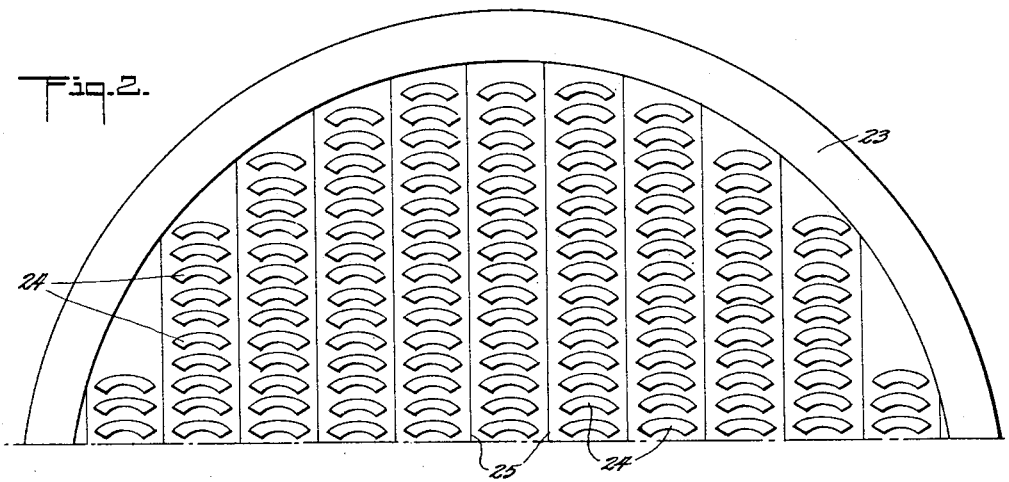
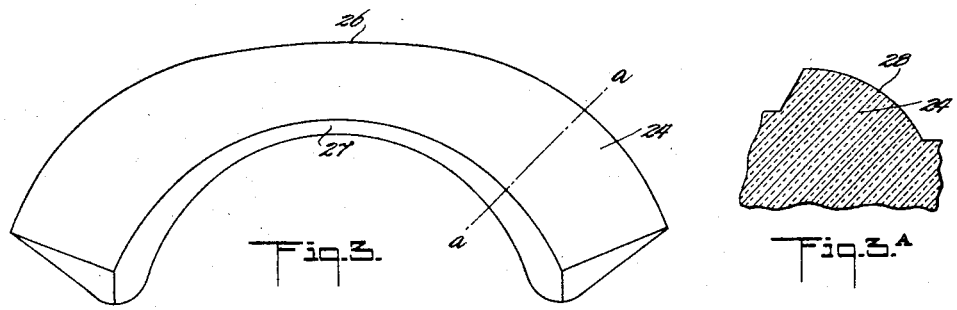
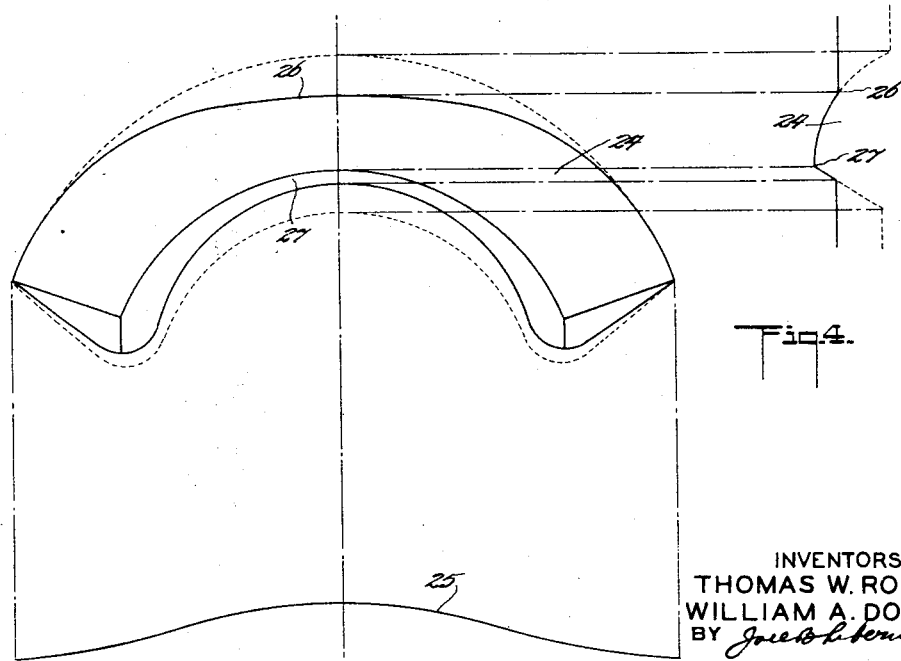
INVENTORS
THOMAS W. ROLPH
WILLIAM A. DOREY
BY
ATTORNEY Aug. 13, 1929. T. W. ROLPH ET AL 1,724,727
LUMINAIR
Original Filed Dec. 24, 1925   3 Sheets-Sheet 3

INVENTORS
THOMAS W. ROLPH
WILLIAM A. DOREY
BY
ATTORNEY

Patented Aug. 13, 1929.

1,724,727

UNITED STATES PATENT OFFICE.

THOMAS W. ROLPH AND WILLIAM A. DOREY, OF NEWARK, OHIO, ASSIGNORS TO HOLOPHANE COMPANY, INC., OF NEW YORK, N. Y., A CORPORATION OF NEW YORK.

LUMINAIR.

Original application filed December 24, 1925, Serial No. 77,500. Divided and this application filed September 6, 1928. Serial No. 304,202.

This application is a division of application S. N. 77,500, Filed Dec. 24, 1925.

The object of this invention is the construction of a prismatic device for use in cases where long substantially rectangular areas are to be lighted and where the light source is placed above and at one end of the area. If such a unit be correctly designated for this purpose and then be raised so that the plane of illumination is at eye level instead of the street or floor level, it will then serve very effectively as a signal to traffic.

If the unit be used as a signal, it is desirable that the light source image giving the signal shall be as large as possible at all angles in the field and it is therefore desirable that the whole face of the unit shall appear to be light giving from any angle in the field.

If such a unit is to be used for illumination purposes only, it is not absolutely essential that the light source images at any given angle in the field cover the whole face of the unit.

That part of the resultant beam which is to light the opposite end of the rectangle must be emitted at a high angle, will be projected the greatest distance, and will require the least lateral angular spread so as to fulfill the requirements. That part of the resultant beam lighting the adjacent end of the rectangle must be emitted at a low angle and it has the shortest distance to travel and requires the greatest lateral angular spread. At low angles in the field the light should be of very low intensity and wide spread compared to the light delivered at the highest angles in the field and for ideal service the intensity should systematically increase and the lateral spread decrease as the vertical angle in the field arises. The extreme variation in intensity required in the field increases greatly when the length of the rectangle is very great in proportion to the mounting height of the unit, and therefore provision for a rapid diminution of intensity at low angles becomes of great practical importance in extreme cases such as automobile headlighting and traffic control signals used in city streets. For any given set of conditions in such classes of service, the distribution requirements can very well be figured out on the basis of the field or light pattern to be produced by the unit on a vertical surface and if the unit is to be mounted in the center of the end of the rectangle, this light pattern on a vertical surface will be an isosceles trapezoid of wide angle. The intensity will drop off rapidly in downward directions and will be uniform laterally along the intercept of any cone with perpendicular axis through the light source. The light from an ordinary source can be concentrated most efficiently in the general direction required by means of parabolic reflectors or condensing lenses, mounted with their axes horizontal or pointed slightly downward, but the pattern produced on a vertical surface will be circular and if the apparatus be adjusted to give the highest intensity within the field, the intensity will be greatest at the center of the circle and fall off uniformly in all directions from that point.

The object of our invention is to provide cover glasses for ordinary light projecting apparatus which will consist of a background permitting a portion of the beam to pass through undeviated or slightly spread and in addition provide a prismatic construction for redirecting the balance of the beam in accordance with requirements of the distribution.

Figure 1 is a diagram of the vertical light pattern required for a traffic signal mounted at center of street.

Figure 7:
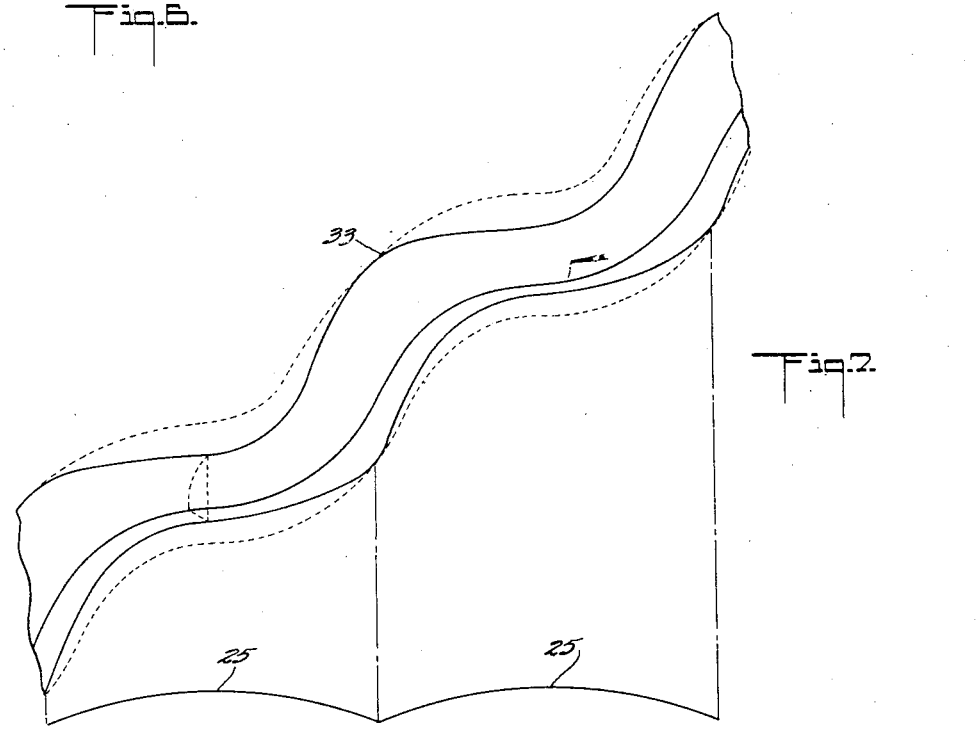

Figure 2 is a rear view of a cover glass embodying the principles of our invention. Figs. 3, 3ª and 4 are enlarged views of prisms used on covers shown in Fig. 2. Fig. 5 is a lay-out of a modification of prisms adapted for use in glasses as shown in Fig. 2. Figs. 6 and 7 are face views of varieties of prisms adapted for use in cover glasses as shown in Fig. 2.

Fig. 1 is a diagram of the vertical light pattern required for a traffic signal mounted at center of street; 1 represents the far boundary of the rectangle to be lit, 2 the near boundary and 3, 3, the side boundaries. Lines 4, 5, 6, 7, 8 and 9 are lines of equal intensity and are chosen so that their difference in intensity is constant. For instance, if the intensity at 5 is 100 c. p. less than at 4, then the intensity at 6 is 100 c. p. less than the intensity at 5, etc.

A cover glass embodying our invention is shown in Fig. 2. In this construction that portion of the surface of the cover glass 23 which is to redirect light downward and outward is occupied by curved prisms 24 each in the form of an arc of a circle. The surface of the glass is covered by these arcs but they are so spaced that portion of the surface between them may be left plain or occupied by flutes 25 so that the portion of the light passing between the arcs goes through the cover glass undeviated or slightly spread. To attain the distribution requirements illustrated in Fig. 1 the arc extends outward and downward from its center on both sides symmetrically to an angle such that the prism at the extremities directs light along the angular direction of line 3 in Fig. 1. Because the distance from the top of the triangular construction of Fig. 1 is greater to the extremities of line 9 than to the intersection of line 9 with center line 14, it is necessary that the prism be deepest at the extremities of the arc and shallowest at the center of the arc. In other words, the center portion of the arc turns light directly downward and the extremities turn light out at an angle corresponding to line 3 of Fig. 1 so that to obtain the required distribution, it is necessary to redirect the light to a greater angular distance along line 3 than along line 14. This accounts for the peculiar shape of the prism shown in Fig. 2 and in enlarged scale in Figs. 3, 3ᵃ and 4. The inside contour of the prism is a perfect arc of a circle as indicated at 27 but the outside contour 26 varies considerably from a perfect arc so that the prism will be shallowest and narrowest at the center and deepest and widest at the outer edge.

A preferred method of obtaining this form of prism 24 is indicated in enlarged scale in Fig. 4. The curvilinear prism is cut in the mold to the same depth and width throughout its entire arc. Then the flutes 25 which occupy the space between prisms are so spaced and of such dimensions that when they are cut in, the full depth of the flute cuts through the background at the center of the arc of the prism and the flute runs out to zero depth at the extremities of the arc. This cuts away the background of the prism as indicated at 26, Fig. 4 in such a proportion that the curvilinear prism varies in approximately the correct way from minimum depth and width at the center to maximum depth and width at the extremities. Thus the flute 25 performs the double function of (1) giving a spread to the light which does not strike the curvilinear prism and (2) modifying the shape of the curvilinear prism from a perfect arc to the correct shape.

In any cross section through the prism such as the cross section A—A Fig. 3ᵃ, the contour of the working face 28 of the prism is curved so that the light intensity or candle-power approximates the indications of Fig. 1 and varies in a definite and regular manner from the top of the diagram in Fig. 1 to the various points on line 9 of Fig. 1.

While this curvilinear prism is in the form of an arc curving from the center downward toward each extremity, similar results can be obtained with the prism curving upward from the center towards each extremity. The downward curvature has been shown in the diagram because losses on the straight side of the prism will be less when the prism curves downward than when it curves upward.

It may sometimes be desirable to obtain either the right hand or left hand half only of the distribution indicated in Fig. 1. In that case, one or the other half of each curvilinear prism would be used in place of the whole prism.

Whenever it is desirable for the entire face of the cover glass to appear evenly lighted, it is necessary to make these curvilinear prisms small in size so that they merge when viewed from a distance. When it is not necessary to obtain such evenly lighted appearance, the prisms can be made of any size.

A variation from the curvilinear prism is indicated in enlarged scale in Fig. 5. In this case, the central plain space included within the inner arc of each prism 29 is reduced to zero and the prism becomes in plan, a sector of a circle except that the shape of the curved boundary of the sector is not an arc of a circle but an arc modified in the same way that the outer contour of the prism is modified in Figures 3 and 4.

Another variation in this construction consists in using curvilinear arc-like prisms 30 with the curve of the arcs extending alternately upward and downward and running the two types 31 and 32 together to form a wave-like construction running horizontally across the cover glass. An indication of this construction is shown in Fig. 6. When this is modified to attain only the right hand or the left hand half of the distribution indicated in Fig. 1, the portions of the curvilinear prism making up the construction fit together in such a way that the wave-like prisms 33 running across the cover glass run diagonally instead of horizontally. This is indicated in enlarged scale in Fig. 7.

In any of the types shown the spaces between the prisms may be corrugated instead of plain.

A condensing lens or other condensing means may be used in connection with the cover glass when used in a traffic or other system.

We claim:

1. A cover glass for a source of light, one surface of the cover glass being arranged in a pattern in which a definite proportion of the surface is composed of curvilinear light directing surfaces separated by spaces, each curved surface varying in depth throughout its length and being adapted to redirect and spread definite proportions of the transmitted light downward and outward.

2. A cover glass for a source of light, one surface of the cover glass being arranged in a pattern in which a definite proportion of the surface is composed of curvilinear light directing surfaces whose active face is spherical in contour separated by spaces and adapted to redirect and spread definite portions of the transmitted light downward and outward.

3. A cover glass for a source of light, one surface of the cover glass being arranged in a pattern in which a definite portion of the surface is composed of various wave-like light directing surfaces running across the surface at any slope and separated by spaces and adapted to redirect and spread definite portions of the transmitted light downward and outward.

4. A cover glass for a source of light, one surface of the cover glass being arranged in a pattern in which a definite proportion of the surface is composed of curvilinear light directing surfaces separated by corrugated spaces, each curved surface varying in depth throughout its length and being adapted to redirect and spread definite proportions of the transmitted light downward and outward.

5. A cover glass for a source of light, one surface of the cover glass being arranged in a pattern in which a definite proportion of the surface is composed of curvilinear light directing surfaces separated by corrugated spaces, each curved surface varying in depth throughout its length and being adapted to redirect and spread definite proportions of the transmitted light downward and outward, the variation in depth of the curved surfaces being obtained by the intersection of these surfaces with the corrugations.

Signed at Newark, in the county of Licking and State of Ohio, this 30th day of August, 1928.

THOMAS W. ROLPH.
WILLIAM A. DOREY.